(12) United States Patent
Olsson et al.

(10) Patent No.: US 9,686,013 B2
(45) Date of Patent: Jun. 20, 2017

(54) COMMUNICATION SYSTEM FOR A NONLINEAR FIBER CHANNEL

(71) Applicant: TELEFONAKTIEBOLAGET L M ERICSSON (PUBL), Stockholm (SE)

(72) Inventors: Bengt-Erik Olsson, Hovås (SE); Arne Alping, Kållered (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 14/654,430

(22) PCT Filed: Dec. 21, 2012

(86) PCT No.: PCT/EP2012/076765
§ 371 (c)(1),
(2) Date: Jun. 19, 2015

(87) PCT Pub. No.: WO2014/094896
PCT Pub. Date: Jun. 26, 2014

(65) Prior Publication Data
US 2015/0341116 A1    Nov. 26, 2015

(51) Int. Cl.
*H04B 10/2543*    (2013.01)
*H04J 14/08*    (2006.01)
(Continued)

(52) U.S. Cl.
CPC ... *H04B 10/2543* (2013.01); *H04B 10/07953* (2013.01); *H04J 14/06* (2013.01);
(Continued)

(58) Field of Classification Search
CPC .......... H04B 10/2543; H04B 10/07953; H04B 2210/25; H04B 10/086; H04L 27/3444;
(Continued)

(56) References Cited

U.S. PATENT DOCUMENTS

| 7,606,498 B1 | 10/2009 | Wu et al. |
| 2012/0177386 A1 | 7/2012 | Zhou et al. |

(Continued)

OTHER PUBLICATIONS

International Search Report and Written Opinion for Application No. PCT/EP2012/076765, mailed Aug. 21, 2013, 9 pages.
(Continued)

*Primary Examiner* — Leslie Pascal
(74) *Attorney, Agent, or Firm* — Nicholson De Vos Webster & Elliott LLP (57) ABSTRACT

A system for communication over a fiber link is disclosed. The system comprises a transmitter to transmit an information signal that comprises an information spectrum, and to transmit two spectrally inverted copies of the information spectrum over the predefined length of the fiber link, the two spectrally inverted copies corresponding to a first spectrum with a first center wavelength and to a second spectrum with a second center wavelength, the second spectrum being inverted relative to the first spectrum and the second center wavelength being different from the first center wavelength, and a receiver to receive the first spectrum and the second spectrum, and to estimate a phase rotation of the second spectrum relative to the first spectrum by comparing a first phase measured from the first spectrum with a second phase measured from the second spectrum.

14 Claims, 5 Drawing Sheets

(51) Int. Cl.

| | | |
|---|---|---|
| *H04L 27/34* | (2006.01) | |
| *H04L 27/22* | (2006.01) | |
| *H04L 27/20* | (2006.01) | |
| *H04B 10/079* | (2013.01) | |
| *H04J 14/06* | (2006.01) | |
| *H04J 14/02* | (2006.01) | |

(52) U.S. Cl.
CPC ........ *H04J 14/086* (2013.01); *H04L 27/2096* (2013.01); *H04L 27/223* (2013.01); *H04L 27/3444* (2013.01); *H04B 2210/25* (2013.01); *H04J 14/02* (2013.01)

(58) Field of Classification Search
CPC .... H04L 27/223; H04L 27/2096; H04J 14/06; H04J 14/02
See application file for complete search history.

(56) References Cited

U.S. PATENT DOCUMENTS

| | | |
|---|---|---|
| 2012/0224855 A1 | 9/2012 | Liu et al. |
| 2014/0003815 A1* | 1/2014 | Mertz ............. H04J 14/06 398/65 |

OTHER PUBLICATIONS

Brener et al., "Reduction of Cross-Phase Modulation-Induced Impairments in Long-Haul WDM Telecommunication Systems Via Spectral Inversion," IEEE Photonics Technology Letters, vol. 16, No. 2, Feb. 1, 2004, pp. 677-679.

Qiao et al., "Fiber Nonlinearity PostCompensation via Spectral Inversion for 40Gb/s Long-haul CO-OFDM Transmission Systems," Optical Transmission Systems, Switching, and Subsystems VIII, vol. 7988, No. 1, Dec. 26, 2010, pp. 1-11.

* cited by examiner

COMMUNICATION SYSTEM FOR A NONLINEAR FIBER CHANNEL

CROSS-REFERENCE TO RELATED APPLICATIONS

This application is a National stage of International Application No. PCT/EP2012/076765, filed Dec. 21, 2012, which is hereby incorporated by reference.

TECHNICAL FIELD

The disclosure relates to a system configured for communication over a fiber link.

BACKGROUND

Nowadays nonlinear fiber effects, such as self-phase modulation, SPM for short and cross-phase modulation, XPM for short, are the main limitation for increased transmission distance and/or higher throughput over an optical fiber link or a fiber link, respectively. The origin is that longer transmission distance and higher capacity require more optical power in the fiber in order to meet the required optical signal-to-noise ratio, OSNR for short, at the receiver end. However, at a certain power level, nonlinear fiber effects, such as SPM and XPM, convert amplitude modulation into phase modulation onto data present in the fiber. SPM occurs when amplitude modulation of a transmitted signal imposes a phase modulation onto the same signal and XPM corresponds to the case when amplitude modulation is converted to phase modulation of a signal at a different wavelength. In a dense wavelength division multiplexed communication system, DWDM system for short, XPM introduces crosstalk between adjacent wavelength channels and SPM introduces distortion within a particular DWDM channel.

Figure 1:
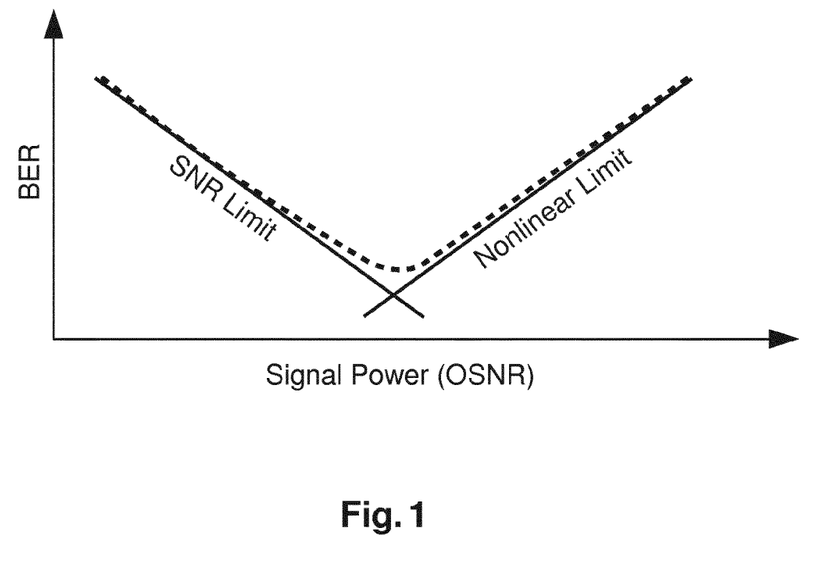
FIG. 1 illustrates a principle of linear and nonlinear limitation of optical transmission performance according to the prior art.

FIG. 1 shows the principle of linear and nonlinear limitation of optical transmission performance according to the prior art. The OSNR limit is due to noise, fundamentally generated by amplifiers and other active components, and the nonlinear limit arises because of nonlinear distortion in the optical fiber. The dashed line in FIG. 1 indicates a typical result in a practical fiber link. In other words, FIG. 1 illustrates linear and nonlinear limitation in bit-error-ratio, BER for short, versus optical power into an optical link. At low input power, the BER becomes lower for increased optical power due to a corresponding increase in OSNR while at a certain point the BER saturates and eventually becomes worse for further increase in optical power due to fiber nonlinearities. The left part of the curve in FIG. 1 indicates the BER limitation due to OSNR only, i.e. with no impact of nonlinearities, and the right part of the curve in FIG. 1 indicates the limitation due to fiber nonlinearities. The dashed line exemplifies a typical behavior of BER versus span launch optical power for a conventional multi-span transmission link or a conventional optical link, respectively. The nonlinear limit in FIG. 1 is a fundamental limitation to further increase the reach and/or capacity of fiber optic transmission systems and thus there is currently a big effort within the fiber optic industry to find ways to push the nonlinear limit towards higher optical power levels.

Nonlinearities can to some extent be mitigated by either hardware- or software-based mitigation techniques. Hardware-based techniques include mid-span spectrum inversion that requires an optical spectrum inverter approximately in the middle of the link but has the advantage of not requiring any additional signal processing. Software-based mitigation techniques for SPM have been extensively investigated during the last few years due to the possibility to implement such techniques in a digital signal processor, DSP for short, but have so far not been used commercially due to extremely large computation complexity. The best technique used in the DSP so far is called digital back propagation, DBP for short, which tries to numerically estimate the optical field at various positions in the fiber in order to determine the impact of SPM. When the amount of phase rotation of a received symbol is estimated, this can be corrected in the received symbol and thus reduce the possibility of an erroneously detected symbol.

An alternative possibility to increase the capacity in fiber optic systems could be to utilize better optical amplifiers that add less noise to the signal and thus allow longer transmission distances or higher spectral efficiency. Today erbium-doped fiber amplifiers, EDFAs for short, are massively deployed and these have a theoretical noise figure, NF for short, of 3 dB.

The main problem with DBP is the extreme computation complexity required in the DSP that has to be performed on every received symbol. Already at around 10 Gbit/s to 100 Gbit/s per DWDM channel, the required computation complexity is not practically possible to implement in any DSP hardware available today and most likely not even within foreseeable time. All experimental results are so far performed in DSPs implemented with so-called off-line processing where a short batch of sampled data is processed in a computer using very long time and complex calculation software written in, for instance, MATLAB or C programming language. Another fundamental problem with DBP is that XPM cannot be included since that would require information about what information is present on the disturbing adjacent DWDM channels which is in general not possible since these DWDM channels are independent of each other.

SUMMARY

It is the object of the disclosure to provide a possibility for increasing tolerance to fiber nonlinearities in connection with enabling longer reach and higher capacity of a fiber link or an optical link, respectively.

This object is achieved by the subject matter of the independent claims. Exemplary embodiments are defined in the sub claims.

According to a first aspect of the disclosure, this object is achieved by a system, configured for communication over a fiber link with a predefined length, comprising a transmitter configured for transmitting an information signal, wherein the information signal comprises an information spectrum, and wherein the transmitter is further configured for transmitting two spectrally inverted copies of the information spectrum over the predefined length of the fiber link, the two spectrally inverted copies corresponding to a first spectrum with a first center wavelength and to a second spectrum with a second center wavelength, the second spectrum being inverted relative to the first spectrum and the second center wavelength being different from the first center wavelength. The system further comprises a receiver configured for receiving the first spectrum and the second spectrum, the receiver comprising a signal processing unit configured for estimating a phase rotation of the second spectrum relative to the first spectrum by comparing a first phase measured from the first spectrum received with a second phase measured from the second spectrum received such that the estimated phase rotation of the second spectrum relative to the first spectrum is at least partly removed.

It is an idea of the disclosure to co-propagate two spectrally inverted copies or replicas of the information spectrum that are to be transmitted over a fiber or a fiber link, respectively. Preferably, the two copies of the data are transmitted on slightly different wavelengths or wavelength channels adjacent to each other but with their corresponding spectra inverted relative to each other. The terms "inverted" and "mirrored" relate to the spectral domain, the time domain and an IQ—or symbol domain of a signal, respectively, but will be utilized in their general sense in an equivalent manner, in particular whenever it is referred to "inverted" it can also mean "mirrored" irrespective of whether a signal in its spectrum domain, in its time domain or its symbol domain is referred to. In particular, when referring to the information signal in its time domain, its constellation in a symbol domain is mirrored to a predefined symbol mapping axis and the corresponding information spectrum, which comprises a first and a second spectrum, is inverted with regard to a predefined frequency, such as the laser frequency emitted. With regard to a physical signal in the time domain "mirrored" and "inverted" has an analogue meaning and will be used in an equivalent manner and this will also be done when referring to the spectral domain or the symbol domain of the physical signal, as also indicated above. For instance, a mathematical definition for the inversion can be given by changing the sign, i.e. a multiplication with a factor of −1, of the imaginary part of the signal plus an arbitrary phase rotation of the whole signal. Preferably, at the receiver end the phase rotation of a received symbol or a received signal, respectively, is estimated. A spectrum measured is typically a complex spectrum comprising an amplitude and a phase. A phase rotation is preferably calculated or estimated, respectively, by the corresponding spectrum received and then the phase of the spectrum received is extracted, i.e. by receiving or measuring the spectrum one also measures inter alia the phase of the spectrum. Estimating the phase rotation is preferably done by comparing a first phase measured from the first spectrum with a second phase measured from the second spectrum, i.e. the phases from the inverted spectrum and from the non-inverted spectrum are compared such that the estimated phase rotation of the second spectrum relative to the first spectrum is at least partly removed. Typically, the linear phase rotation of both spectra received are equal assuming inter alia same propagation conditions over the fiber, whereas there is usually but not always at least a slight deviation in the corresponding nonlinear phase rotation of the two spectra received. Furthermore, it is noted that the first spectrum and the second spectrum emitted from the transmitter towards the fiber link are typically not the same spectra received at the end of the fiber link, i.e. at the receiver end, due to the transmission or propagation of the information signal over the fiber. A phase typically experiences a rotation when being transmitted over a fiber or a link, respectively. The phase preferably comprises a linear phase rotation and a nonlinear phase rotation. The nonlinear phase rotation can be different for each transmitted symbol or transmitted signal, respectively. It is further noted that the term "received" is used in equivalent manner to the terms "detected", "determined" or "measured".

Nonlinear phase modulation by means of SPM and XPM is preferably imprinted on both spectrally inverted copies of the information spectrum. Since the two copies are spectrally inverted, the nonlinear phase rotation of the transmitted symbol or transmitted signal, respectively, preferably rotates the symbol in a different direction dependent on spectrum orientation. The two signal replicas are preferably independently received and estimated in the receiver and the inverted signal or inverted copy, respectively, is re-inverted and compared with the non-inverted signal which is preferably done in a subsequent part of a DSP. Then, the average phase rotation or the average phase, respectively, between the two estimated symbols is preferably calculated and utilized to remove the impact of SPM or XPM at least partly. It is advantageous that the DSP complexity of such is roughly increased only by a factor of two since the final nonlinearity estimation is simple and reliable.

The phase rotation of the information signal or the phase rotation of its corresponding information spectrum, respectively, is due to the transmission of the information signal over the fiber. The term "the second spectrum being inverted relative to the first spectrum" means that the shape of the second spectrum preferably corresponds to the shape of the first spectrum but is inverted with regard to the laser frequency emitted or any other predefined frequency. The term "estimating a phase rotation of the second spectrum relative to the first spectrum" means that a total phase rotation is calculated or estimated by comparing a first phase measured from the first spectrum with a second phase measured from the second spectrum. A "phase rotation" is typically referred to as "phase shift" in the frequency domain but these terms are also used with an equivalent meaning irrespective of being in time, frequency or symbol domain. The "total phase rotation" is also referred to as "phase rotation" in the following and comprises a linear part and a nonlinear part. Estimating the phase rotation is preferably done by means of measurement data of the phases of the corresponding spectra received and/or by using empirical values for the phases. Preferably, the phases of the first spectrum and the second spectrum at the transmitter end of the fiber link are known. Then, the phases are measured at the receiver end, i.e. the phase from the second spectrum and from the first spectrum is measured, and the difference of the phases measured is preferably used to estimate the phase rotation of the first phase of the first spectrum relative to the second phase of the second spectrum. With the difference of the phases the phase rotation is easily obtainable, i.e. the phase rotation of the second spectrum relative to the first spectrum is at least partly removable or ideally fully removable. The re-inverted copy of the second spectrum preferably resembles or even is identical to the original copy or first spectrum so that at least a partly compensation or even a full compensation of phase rotation becomes possible.

According to a preferred embodiment of the disclosure, the signal processing unit is configured for estimating the phase rotation of the second spectrum relative to the first spectrum by performing an averaging algorithm on the first phase measured from the first spectrum and the second phase measured from the second spectrum, wherein the first phase comprises a first rotation direction and the second phase comprises a second rotation direction, the second rotation direction being different from the first rotation direction. The averaging algorithm preferably comprises averaging of at least two phases measured from the first spectrum and of at least two phases measured from the second spectrum. Preferably, by using a coding algorithm, such as a Gray code, and/or by using a training sequence a correction of a multiple $\pi$ phase rotation is obtained. Hence, even the impact of multiple $\pi$ phase rotation becomes compensated.

According to a exemplary embodiment of the disclosure, the transmitter comprises a lasing unit configured for emitting a laser signal, an optical modulator and an encoding unit, wherein the encoding unit is configured for encoding the laser signal emitted onto a radio frequency carrier, wherein the laser signal encoded is amplified and thereafter modulated onto light by the optical modulator such that two spectrally inverted copies of the information spectrum are obtained. The transmitter preferably comprises a first transmitting unit and a second transmitting unit, the first transmitting unit corresponding to the second transmitting unit, wherein the transmitter further comprises a polarization combiner configured for multiplexing an output signal from the first transmitting unit with an output signal from the second transmitting unit, wherein the output signal from the first transmitting unit is more preferably orthogonal relative to the output signal from the second transmitting unit. In this way, a dual-polarization operation is obtainable. Furthermore, an impact of polarization mode dispersion, PMD for short, can be taken into account.

According to a exemplary embodiment of the disclosure, the transmitter corresponds to a third transmitting unit and to a fourth transmitting unit, wherein each of the third transmitting unit and the fourth transmitting unit comprises a signal processing unit and a digital-analog-converter, wherein the third transmitting unit and the fourth transmitting unit are configured for generating two spectrally inverted copies of the information spectrum.

According to an exemplary embodiment of the disclosure, the encoding unit is configured for encoding the laser signal by using at least one of amplitude quadrature modulation, phase shift keying and on-off keying.

According to a exemplary embodiment of the disclosure, the system comprises a multiplexing unit configured for injecting the information signal transmitted into the fiber link, wherein the fiber link comprises a plurality of amplification units connectable to one another by a plurality of fiber spans, wherein a total length of the plurality of fiber spans corresponds to the predefined length of the fiber link.

According to an exemplary embodiment of the disclosure, the system comprises a demultiplexing unit configured for injecting the information signal transmitted over the predefined length at an end of the fiber link into the receiver.

According to a exemplary embodiment of the disclosure, the receiver further comprises a detecting unit configured for detecting the information signal transmitted over the predefined length of the fiber link (2), wherein the information signal detected is directed to the signal processing unit (7) configured for performing at least one of channel equalization, polarization channel recovery and polarization channel demultiplexing. The signal processing unit preferably comprises a first part and a second part, wherein the first part is configured for determining the first spectrum and for determining the second spectrum and for re-inverting the second spectrum relative to the first spectrum, and wherein the second part is configured for comparing the first spectrum determined with the second spectrum determined and for estimating the phase rotation of the second spectrum relative to the first spectrum. The receiver preferably further comprises a feedback unit connectable between the first part and the second part and configured for sending a feedback signal from the second part to the first part in the signal processing unit, wherein the feedback signal comprises a phase information comprising a difference in phase rotation of the second phase of the second spectrum relative to the first phase of the first spectrum. In this way, the phase rotation is at least partly compensable or at least partly removable or even completely compensable or removable, respectively.

Hence, fiber nonlinearities are tolerable to a larger extent and thus a longer reach and a higher capacity of the fiber link are obtained.

According to a second aspect of the disclosure, abovementioned object is achieved by a transmitter, configured for transmitting an information signal over a fiber link, wherein the information signal comprises an information spectrum, and wherein the transmitter is further configured for transmitting two spectrally inverted copies of the information spectrum over the fiber link, the two spectrally inverted copies corresponding to a first spectrum with a first center wavelength and to a second spectrum with a second center wavelength, the second spectrum being inverted relative to the first spectrum and the second center wavelength being different from the first center wavelength.

According to a third aspect of the disclosure, abovementioned object is achieved by a receiver, configured for receiving an information signal, wherein the information signal comprises an information spectrum comprising a first spectrum and a second spectrum, the second spectrum being inverted relative to the first spectrum, the receiver comprising a signal processing unit configured for estimating a phase rotation of the second spectrum relative to the first spectrum by comparing a first phase measured from the first spectrum received with a second phase measured from the second spectrum received, wherein the signal processing unit is further configured for removing the estimated phase rotation of the second spectrum relative to the first spectrum at least partly.

According to a fourth aspect of the disclosure, abovementioned object is achieved by a method for communicating over a fiber link, comprising the steps of a) transmitting an information signal, wherein the information signal comprises an information spectrum, thereby transmitting two spectrally inverted copies of the information spectrum over the fiber link, the two spectrally inverted copies corresponding to a first spectrum with a first center wavelength and to a second spectrum with a second center wavelength, the second spectrum being inverted relative to the first spectrum and the second center wavelength being different from the first center wavelength, b) receiving the first spectrum and the second spectrum, thereby estimating a phase rotation of the second spectrum relative to the first spectrum by comparing a first phase measured from the first spectrum received with a second phase measured from the second spectrum received, and c) removing the estimated phase rotation of the second spectrum relative to the first spectrum at least partly.

Hence, it is an idea of the disclosure to transmit two copies of data over an optical link with their corresponding optical spectra inverted relative to each other. Both copies are preferably independently recovered and compared in order to provide an estimate of the transmitted symbol or transmitted signal, respectively, in presence of fiber nonlinear effects, such as in presence of SPM and XPM. Advantageously, the existence of two signal mirrors throughout the transmission link is utilized to simplify the implementation of phase sensitive optical amplifiers, such as of parametric optical amplifiers, since a major source of complexity in such kind of amplifiers is the creation of two signal mirrors upon arrival at the amplifier node. Using the disclosure at hand advantageously enables the application of such promising optical amplifiers. Therefore, a significantly better performance of an optical communication system is enabled by extending the transmission reach and/or by increasing capacity and/or by allowing co-existence of modern modulation formats. Further, the DSP implementation is simpler than for example using full DBP. The practical implementation of low noise phase sensitive optical amplifiers in commercial optical transmission systems is advantageously also enabled.

BRIEF DESCRIPTION OF THE DRAWINGS

Further objects and advantages of the present disclosure will become apparent from the following description of the exemplary embodiments that are given by way of example with reference to the accompanying drawings. In the figures.

DETAILED DESCRIPTION

Figure 2:
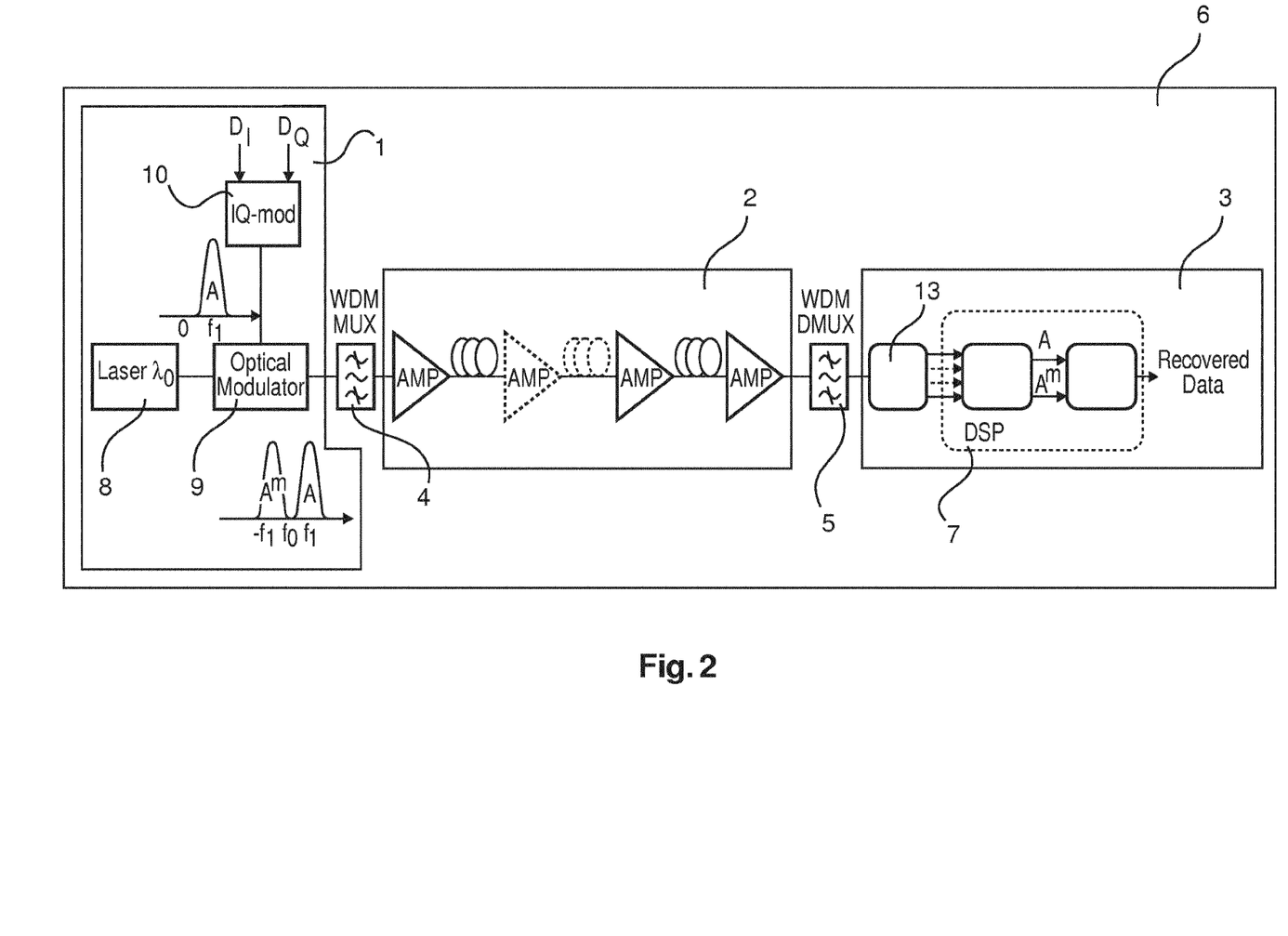
FIG. 2 shows a communication system for single polarization transmission, a transmitter and a receiver according to a first exemplary embodiment of the disclosure.

FIG. 2 shows a communication system for a single polarization communication system comprising a transmitter 1 and a receiver 3 according to a first exemplary embodiment of the disclosure. The amplification units, abbreviated as AMP in FIG. 2, are conventional EDFAs in this first exemplary embodiment. According to other exemplary embodiments of the disclosure, the AMPs are phase sensitive optical amplifiers. The communication system 6 comprises a fiber link 2 with a predefined fixed length corresponding to the total length of the plurality of fiber spans connected to each other. The system 6 tolerates significant impact of nonlinear effects, such as of SPM and of XPM. The information signal to be transmitted is first encoded onto a radio frequency carrier $f_1$ and after suitable amplification subsequently modulated onto light using an optical modulator, such as an amplitude modulator. In this first exemplary embodiment of the disclosure a Mach-Zehnder modulator, MZM for short, is used. At the output of the optical modulator two sidebands are present at frequencies $\pm f_1$ around the laser frequency $f_0$. The two sidebands correspond to a first spectrum and to a second spectrum, wherein the second spectrum is inverted relative to the first spectrum with regard to the laser frequency emitted by the laser 8. Ideally, no light is present at the original laser frequency $f_0$ if the optical modulator is properly biased. However, in this first exemplary embodiment of the disclosure, some residual light is present at the laser frequency $f_0$. By adjusting the bias point of the MZM, the amount of light at $f_0$ is adjusted such that a negligible distortion of the information at the radio frequency carrier frequency $f_1$, RF carrier frequency for short, is obtained.

Any residual light at $f_0$ is used in the transmission system for optical or electrical phase recovery in, for instance, a receiver representing an electrical solution, or in a phase sensitive parametric amplifier in the transmission link as a source for the pump representing an optical solution. According to other exemplary embodiments of the disclosure, if a dual polarization operation is required two identical transmitters are multiplexed using a polarization combiner. The transmitter 1 transmits an information signal, wherein the information signal comprises an information spectrum. The transmitter 1 transmits two spectrally inverted copies of the information spectrum over the fiber link 2 towards the receiver 3. The two spectrally inverted copies correspond to a first spectrum and to a second spectrum, respectively, wherein the second spectrum is inverted relative to the first spectrum. The receiver 3 receives the first spectrum and the second spectrum separately and comprises a signal processing unit 7 configured for estimating a phase rotation of the second spectrum relative to the first spectrum. The estimation is done by the measured phases of the two corresponding spectra received independently in this first exemplary embodiment. Since the linear and nonlinear phase rotation of the second spectrum relative to the first spectrum is obtained, the total phase rotation is fully removed in this first exemplary embodiment of the disclosure.

According to the first exemplary embodiment of the disclosure, the output signal from the transmitter 1 is further injected to the optical transmission link, i.e. to the DWDM transmission link or fiber link 2, respectively. This is done by means of a wavelength division multiplexing unit 4, abbreviated as "WDM MUX" in FIG. 2. Both sidebands around $f_0$ co-propagate throughout the link with the same amplitude and experience the same amount of nonlinear phase modulation, either SPM or XPM. Preferably, the two co-propagating signals are spaced as closely as possible in order to ensure a similar linear and nonlinear distortion as possible. In this way, chromatic dispersion, CD for short, SPM and XPM have a similar impact on both signals. Furthermore, close spacing saves optical bandwidth. The system 6 further comprises a demultiplexing unit 5, abbreviated as "WDM DMUX" in FIG. 2, which injects the information signal transmitted over the predefined length at and end of the fiber link 2 into the receiver 3.

According to the first exemplary embodiment of the disclosure, the transmitter 1 comprises a laser 8, an optical modulator 9 and an encoder 10. Further, the mirrored signal is indicated with an "m" in FIG. 2. In the receiver 3, both sidebands are detected using a detecting unit 13 converting both phase and amplitude of the optical fields into the electrical domain. The detecting unit 13 is a linear coherent receiver which is a homodyne receiver in this first exemplary embodiment of the disclosure. According to other exemplary embodiments of the disclosure this is done by an incoherent receiver or a heterodyne receiver. Together with the coherent receiver 13 a signal processing unit 7 comprising a DSP is used to perform channel equalization, i.e. CD and PMD, are compensated, either using static channel information or adaptively from decision parameters obtained later in the DSP signal flow. According to another exemplary embodiment of the disclosure, in case of a polarization multiplexed system also a polarization channel recovery and a demultiplexing are performed. The DSP inverts back the signal of the inverted sideband signal and tries to estimate the received symbol in each optical sideband before the estimates are fed to a second part of the DSP that compares the two signals or two symbols, respectively, and estimates the amount of linear and/or nonlinear phase distortion.

Figure 3:
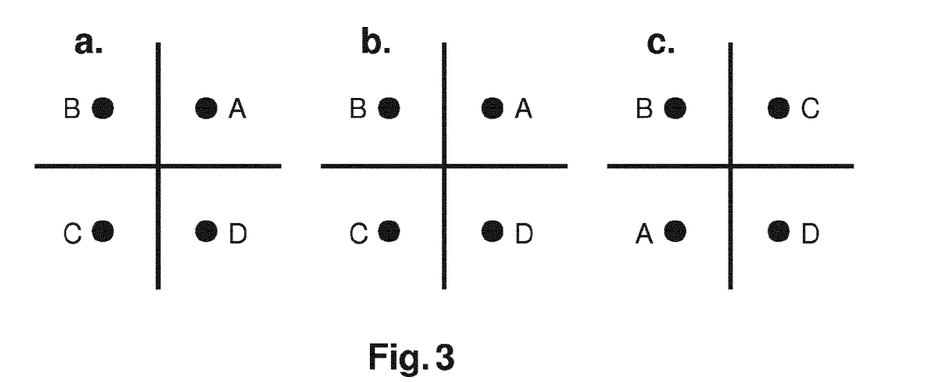
FIG. 3 shows physical symbol mapping for QPSK modulation (a) before optical modulation, (b) after optical modulation of RF carrier onto light in the non-inverted sideband and (c) in the other mirrored, i.e. inverted, sideband according to the first exemplary embodiment of the disclosure.

FIG. 3 illustrates physical symbol mapping for quadrature phase shift keying modulation, QPSK modulation for short, (a) before optical modulation, (b) after optical modulation of RF carrier onto light in the non-inverted sideband and (c) in the other mirrored, i.e. inverted, sideband according to the first exemplary embodiment of the disclosure. Hence, FIG. 3 shows the relation between the inverted and the non-inverted spectrum with regard to symbol mapping. FIG. 3 shows the effect of QPSK constellation and when one compares non-inverted and inverted signals in FIG. 3b and FIG. 3c, it is noted that the symbols are shifted such that an optical phase rotation effectively rotates the constellations of the two spectrally inverted copies in different directions.

Figure 4:
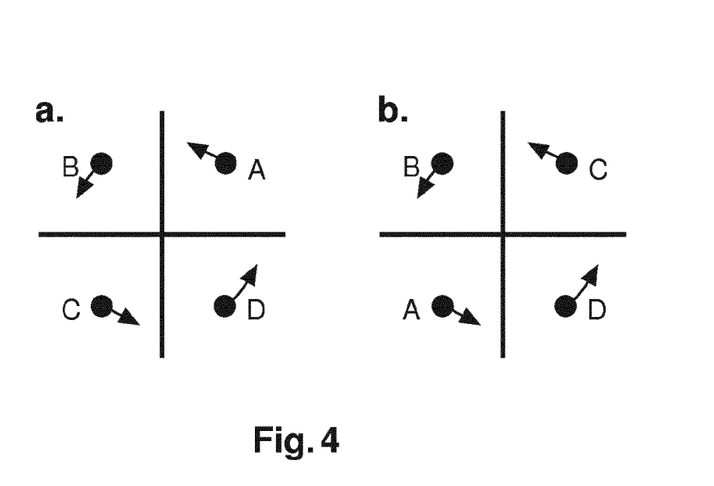
FIG. 4 shows the effect of nonlinear phase rotation of transmitted symbols according to the first exemplary embodiment of the disclosure.

FIG. 4 illustrates the effect of nonlinear phase rotation of transmitted symbols according to the first exemplary embodiment of the disclosure. Hence, the effects of optical phase modulation on the two sidebands are shown where both signals are rotated in the same direction. However, since the constellation in FIG. 4b is inverted, the effect of the rotation after re-inversion is that the two signals are rotated in opposite directions as will be illustrated in FIG. 5. The arrows in FIG. 4 indicate rotation of the symbols in the non-inverted spectrum (FIG. 4a) and the inverted spectrum (FIG. 4b). It is noted that the inversion process in the receiver is described in FIGS. 4 and 5, whereas FIG. 4 shows a situation before inversion in the receiver and FIG. 5 shows a situation after inversion in the receiver.

Figure 5:
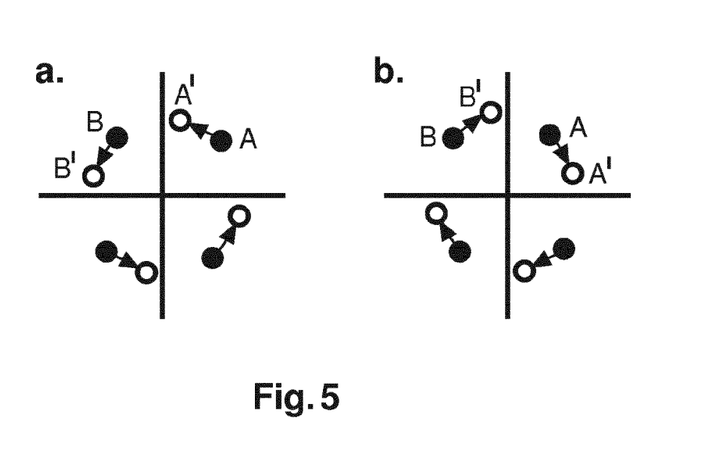
FIG. 5 shows the effect of nonlinear phase rotation on symbols in (a) the non-inverted spectrum and in (b) the inverted spectrum after re-inversion in the DSP according to the first exemplary embodiment of the disclosure.

FIG. 5 shows the effect of nonlinear phase rotation on symbols in (a) the non-inverted spectrum and (b) in the inverted spectrum after re-inversion in the signal processing unit corresponding to DSP in this first exemplary embodiment of the disclosure. In case of moderate nonlinear phase distortion the symbols recovered from the two sidebands are rotated in different directions, denoted as, for instance, A' in FIG. 5. As long as the nonlinear rotation is less than 180°, the correct symbol is obtained by taking the average of two obtained phase values in this first exemplary embodiment of the disclosure. According to other exemplary embodiments of the disclosure, advanced phase correcting algorithms are used to make a better estimate of the correct phase state of the symbol that may comprise the use of different coding techniques and/or the use of training sequences.

FIGS. 4 and 5 show the effect of spectrum inversion and nonlinear phase modulation, respectively, on QPSK modulated symbols. According to other exemplary embodiments of the disclosure, arbitrary modulation formats, for instance an arbitrary level of amplitude quadrature modulation, QAM for short, are utilized.

Figure 6:
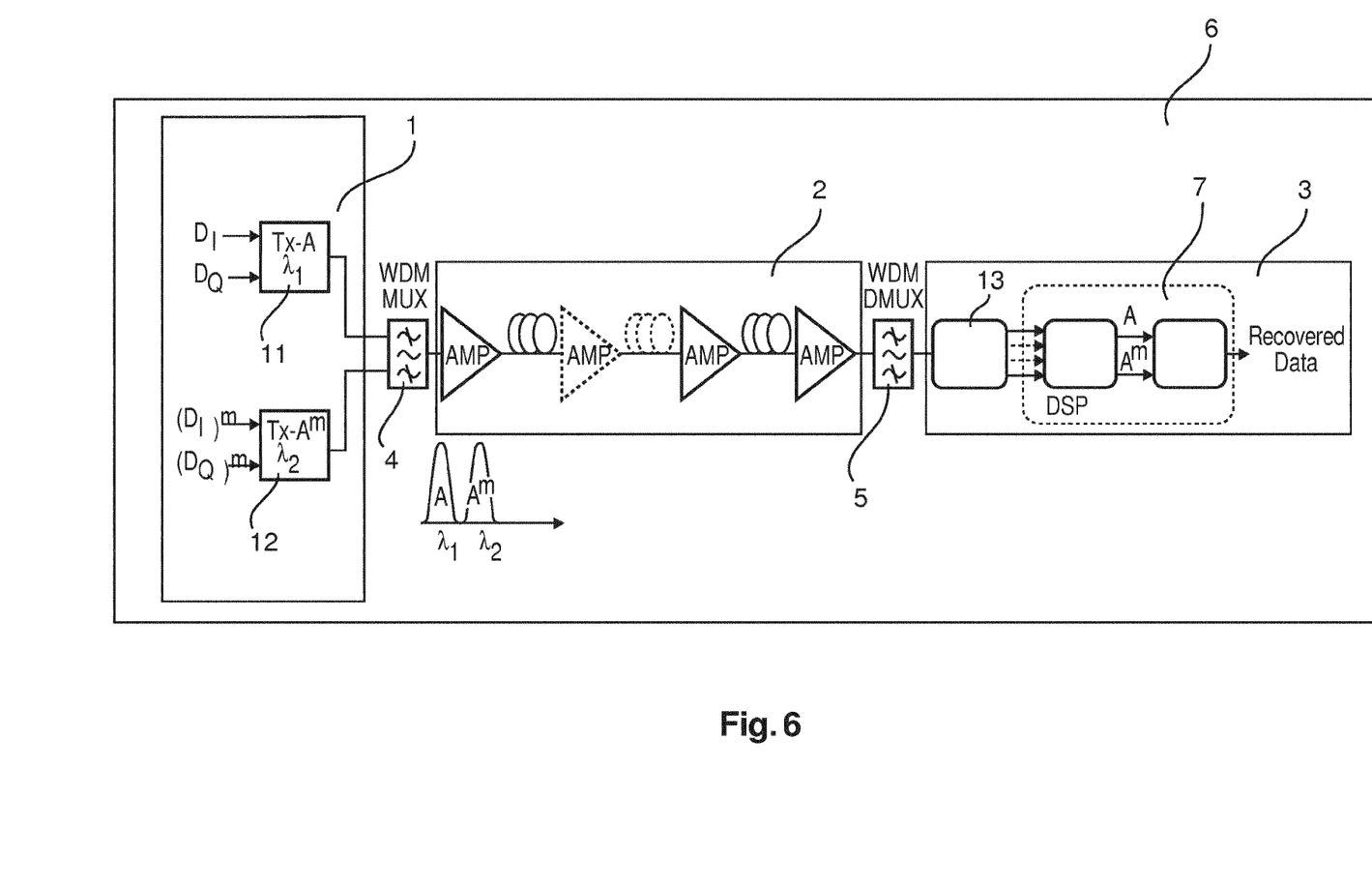
FIG. 6 shows a system for a dual mirror communication and a dual mirror transmitter according to a second exemplary embodiment of the disclosure.

FIG. 6 shows an implementation of a dual mirror channel communication system comprising a dual mirror transmitter 1 according to a second exemplary embodiment of the disclosure. The system 6 corresponds to the system according to the first exemplary embodiment of the disclosure illustrated in FIG. 2 except for the implementation of the transmitter 1. The transmitter 1 generates two spectrally mirrored copies of the information spectrum and the inverted signals are created separately in the signal processing unit 7 comprising a DSP. The inverted signals are converted to real signals using a digital-to-analog converter, DAC for short. According to the second exemplary embodiment of the disclosure, the inverted and non-inverted constellations are created by mapping the symbols as mirrors in the two channels. Advantageously, known optical transmitters and arbitrary modulation formats can be utilized.

According to yet other exemplary embodiments of the disclosure, two signal mirrors in orthogonal polarization states are transmitted making a polarization-resolved transmission and detection possible. This advantageously eliminates the need for two channels on different optical frequencies or wavelengths, respectively. In terms of net spectral efficiency, the two implementations shown in FIG. 6 and FIG. 2 are equally good.

According to the second exemplary embodiment of the disclosure, the transmitter 1 comprises two parts 11, 12. The first part 11 generates the constellation A at a first frequency, indicated as "Tx-A" in FIG. 6, and the second part 12 generates the mirrored constellation A at a second frequency, indicated as "Tx-A'''" in FIG. 6 such that a multi-level signal is obtainable with two inverted channels and two separate transmitters 11, 12 operating at separate optical center wavelengths. In this second exemplary embodiment, a better performance of the optical communication system is obtained since the transmission reach is extended and the capacity is increased allowing co-existence of modern QAM formats with legacy on-off keying data channels, for instance operating at 2.5 Gbit/s and at 10 Gbit/s.

Figure 7:
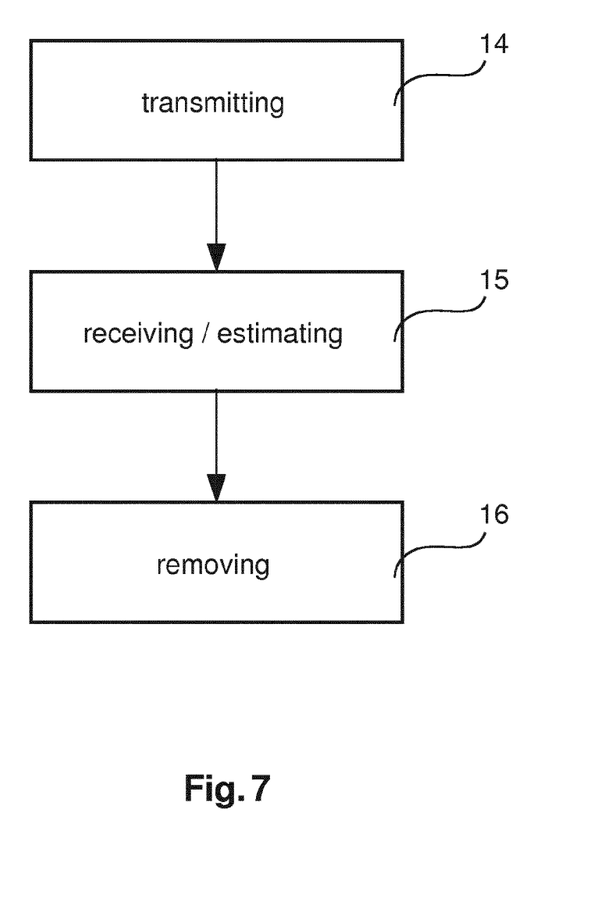
FIG. 7 illustrates the steps of a method for communicating over a fiber link according to a third exemplary embodiment of the disclosure.

FIG. 7 schematically shows the steps of a method for communicating over a fiber link 2 according to a third exemplary embodiment of the disclosure. In a first step, an information signal is transmitted 14, wherein the information signal comprises an information spectrum; thereby two spectrally mirrored copies of the information spectrum are transmitted over a predefined length of the fiber link 2. In this third exemplary embodiment of the disclosure, the first spectrum and the second spectrum are received 15; thereby a phase rotation of the second spectrum relative to the first spectrum is estimated by comparing a first phase measured from the first spectrum received with a second phase measured from the second spectrum received. In a final step, the phase rotation estimated or calculated in the previous step is at least partly removed 16.

While the disclosure has been illustrated and described in detail in the drawings and foregoing description, such illustration and description are to be considered illustrative or exemplarily and not restrictive; the disclosure is not limited to the disclosed embodiments.

Other variations to the disclosed embodiments can be understood and affected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that the combination of these measures cannot be used to advantage. Any references signs in the claims should not be construed as limiting the scope.

The invention claimed is:

1. A system, for communication over a fiber link with a predefined length, comprising:
   a transmitter to transmit an information signal, wherein the information signal comprises an information spectrum, and wherein the transmitter is further to transmit two spectrally inverted copies of the information spectrum over the predefined length of the fiber link, the two spectrally inverted copies corresponding to a first spectrum with a first center wavelength and to a second spectrum with a second center wavelength, the second spectrum being inverted relative to the first spectrum and the second center wavelength being different from the first center wavelength; and a receiver to receive the first spectrum and the second spectrum, the receiver comprising a signal processing unit to estimate a phase rotation of the second spectrum relative to the first spectrum by comparing a first phase measured from the first spectrum received with a second phase measured from the second spectrum received.

2. The system according to claim 1, wherein the signal processing unit is to estimate the phase rotation of the second spectrum relative to the first spectrum by performing an averaging algorithm on the first phase measured from the first spectrum and the second phase measured from the second spectrum, wherein the first phase comprises a first rotation direction and the second phase comprises a second rotation direction, the second rotation direction being different from the first rotation direction.

3. The system according to claim 2, wherein the averaging algorithm comprises averaging of at least two phases measured from the first spectrum and of at least two phases measured from the second spectrum.

4. The system according to claim 1, wherein the transmitter comprises a lasing unit to emit a laser signal, an optical modulator to amplify and to modulate the laser signal such that two spectrally inverted copies of the information spectrum are obtained.

5. The system according to claim 1, wherein the transmitter comprises a first transmitting unit and a second transmitting unit, wherein the transmitter is further to multiplex an output signal from the first transmitting unit with an output signal from the second transmitting unit, wherein the output signal from the first transmitting unit is orthogonal relative to the output signal from the second transmitting unit.

6. The system according to claim 4, wherein the encoding unit is to encode the laser signal by using at least one of amplitude quadrature modulation, phase shift keying and on-off keying.

7. The system according to claim 1, wherein the transmitter includes a first transmitting unit and a second transmitting unit, wherein the first and the second transmitting unit are to generate two spectrally inverted copies of the information spectrum.

8. The system according to claim 1, comprising a multiplexing unit to inject the information signal transmitted into the fiber link, wherein the fiber link comprises a plurality of amplification units connectable to one another by a plurality of fiber spans, wherein a total length of the plurality of fiber spans corresponds to the predefined length of the fiber link.

9. The system according to claim 1, comprising a demultiplexing unit to inject the information signal transmitted over the predefined length at an end of the fiber link into the receiver.

10. The system according to claim 1, wherein the receiver further comprises a detecting unit to detect the information signal transmitted over the predefined length of the fiber link, wherein the information signal detected is directed to the signal processing unit, wherein the signal processing unit is to perform at least one of channel equalization, polarization channel recovery and polarization channel demultiplexing.

11. The system according to claim 10, wherein the signal processing unit comprises a first part and a second part, wherein the first part is to determine the first spectrum and to determine the second spectrum and to re-invert the second spectrum relative to the first spectrum, and wherein the second part is to compare the determined first spectrum with the determined second spectrum and to estimate the phase rotation of the second spectrum relative to the first spectrum.

12. A transmitter, to transmit an information signal over a fiber link, wherein the information signal comprises an information spectrum, and wherein the transmitter is further to transmit two spectrally inverted copies of the information spectrum over the fiber link, the two spectrally inverted copies corresponding to a first spectrum with a first center wavelength and to a second spectrum with a second center wavelength, the second spectrum being inverted relative to the first spectrum and the second center wavelength being different from the first center wavelength.

13. A receiver, to receive an information signal, wherein the information signal comprises an information spectrum comprising a first spectrum and a second spectrum, the second spectrum being inverted relative to the first spectrum, the receiver comprising:

a signal processing unit to estimate a phase rotation of the second spectrum relative to the first spectrum by comparing a first phase measured from the first spectrum received with a second phase measured from the second spectrum received.

14. A method for communicating over a fiber link, comprising:

a) transmitting an information signal, wherein the information signal comprises an information spectrum, thereby transmitting two spectrally inverted copies of the information spectrum over the fiber link, the two spectrally inverted copies corresponding to a first spectrum with a first center wavelength and to a second spectrum with a second center wavelength, the second spectrum being inverted relative to the first spectrum and the second center wavelength being different from the first center wavelength, and b) receiving the first spectrum and the second spectrum, thereby estimating a phase rotation of the second spectrum relative to the first spectrum by comparing a first phase measured from the first spectrum received with a second phase measured from the second spectrum received.

\* \* \* \* \*